(12) United States Patent
Subreville et al.

(10) Patent No.: US 11,353,161 B2
(45) Date of Patent: Jun. 7, 2022

(54) MODULE AND SYSTEM FOR DEPRESSURISING A CRYOGENIC TANK

(71) Applicant: ENGIE, Courbevoie (FR)

(72) Inventors: Patrick Subreville, Ferrieres Haut Clocher (FR); Philippe Liegeois, Maisons-Laffitte (FR); Yacine Zellouf, Asnieres sur Seine (FR); Karim Osman, Gennevilliers (FR); Hicham Guedacha, Marnes la Coquette (FR)

(73) Assignee: ENGIE, Courbevoie (FR)

( * ) Notice: Subject to any disclaimer, the term of this patent is extended or adjusted under 35 U.S.C. 154(b) by 733 days.

(21) Appl. No.: 16/319,013

(22) PCT Filed: Jul. 13, 2017

(86) PCT No.: PCT/FR2017/051930
§ 371 (c)(1),
(2) Date: Jan. 18, 2019

(87) PCT Pub. No.: WO2018/015640
PCT Pub. Date: Jan. 25, 2018

(65) Prior Publication Data
US 2019/0249828 A1    Aug. 15, 2019

(30) Foreign Application Priority Data
Jul. 21, 2016  (FR) ...................... 1656975

(51) Int. Cl.
*F17C 6/00*    (2006.01)

(52) U.S. Cl.
CPC .......... *F17C 6/00* (2013.01); *F17C 2201/054* (2013.01); *F17C 2201/056* (2013.01);
(Continued)

(58) Field of Classification Search
CPC ................ F17C 6/00; F17C 2227/044; F17C 2265/027; F17C 2221/012;
(Continued)

(56) References Cited

U.S. PATENT DOCUMENTS 3,907,515 A * 9/1975 Mulliner ................. C10L 3/006
  48/195
4,817,684 A * 4/1989 Turko .................... F17C 11/007
  141/69

(Continued)

FOREIGN PATENT DOCUMENTS

CN    102840058 A    12/2012
CN    203731079 U    7/2014
(Continued)

OTHER PUBLICATIONS

International Search Report and Written Opinion for PCT Patent App. No. PCT/FR2017/051930 (dated Nov. 10, 2017) with English translation of the ISR.

*Primary Examiner* — Timothy L Maust
*Assistant Examiner* — James R Hakomaki
(74) *Attorney, Agent, or Firm* — Kenealy Vaidya LLP (57) ABSTRACT

Some embodiments are directed to a module for depressurisation and storage of a portion of a gas layer coming from at least one cryogenic tank. Some other embodiments are directed to a system using such a module.

9 Claims, 6 Drawing Sheets

(52) U.S. Cl.
CPC .. *F17C 2221/012* (2013.01); *F17C 2221/033* (2013.01); *F17C 2223/0161* (2013.01); *F17C 2223/033* (2013.01); *F17C 2223/036* (2013.01); *F17C 2225/0123* (2013.01); *F17C 2225/035* (2013.01); *F17C 2225/047* (2013.01); *F17C 2227/0135* (2013.01); *F17C 2227/0157* (2013.01); *F17C 2227/0302* (2013.01); *F17C 2227/044* (2013.01); *F17C 2250/043* (2013.01); *F17C 2250/0439* (2013.01); *F17C 2250/0443* (2013.01); *F17C 2260/042* (2013.01); *F17C 2260/044* (2013.01); *F17C 2265/027* (2013.01); *F17C 2265/032* (2013.01); *F17C 2265/07* (2013.01); *F17C 2270/0168* (2013.01); *Y02E 60/32* (2013.01)

(58) Field of Classification Search
CPC ...... F17C 2223/0161; F17C 2225/0123; F17C 2227/0157; F17C 2227/0302; Y02E 60/32
USPC .......................................................... 62/48.1
See application file for complete search history.

(56) References Cited

U.S. PATENT DOCUMENTS

| | | | | |
|---|---|---|---|---|
| 7,516,752 B2* | 4/2009 | Arnold | ............... | H01M 8/04089 62/48.1 |
| 7,721,557 B1* | 5/2010 | Stearns | .................... | F17C 7/02 62/48.2 |
| 8,281,822 B2* | 10/2012 | Hirakata | ............... | F17C 13/025 141/69 |
| 10,184,614 B2* | 1/2019 | Epstein | ..................... | F17C 9/02 |
| 2003/0154739 A1* | 8/2003 | Fanning | ................ | F25J 1/0271 62/613 |
| 2006/0272709 A1* | 12/2006 | Ting | ..................... | A23L 3/0155 137/487.5 |
| 2009/0142637 A1 | 6/2009 | Handa | | |
| 2009/0200318 A1 | 8/2009 | Handa | | |
| 2009/0308489 A1* | 12/2009 | Hirakata | ............... | F17C 13/025 141/37 |
| 2012/0240600 A1* | 9/2012 | Paulus | ................... | F25J 1/0214 62/48.2 |
| 2013/0306643 A1* | 11/2013 | Lee | ....................... | F17C 13/004 220/560.12 |
| 2014/0033941 A1* | 2/2014 | Foege | ..................... | F16D 31/02 105/1.4 |
| 2014/0116062 A1* | 5/2014 | Hartono | .................... | F17C 9/00 60/772 |
| 2014/0137572 A1* | 5/2014 | Steffen | ...................... | F17C 7/04 62/48.1 |
| 2014/0174083 A1* | 6/2014 | Gerstler | ................ | F17C 13/02 60/651 |
| 2014/0216065 A1* | 8/2014 | Jarrett | ...................... | F17C 9/04 62/48.1 |
| 2015/0020918 A1* | 1/2015 | Macaluso | ................ | F17C 7/00 141/11 |
| 2015/0330574 A1* | 11/2015 | Fuchs | ..................... | F25J 1/005 62/48.2 |
| 2016/0161058 A1* | 6/2016 | Moddemann | ........... | F17C 5/007 220/560.12 |
| 2017/0114960 A1* | 4/2017 | Lee | .......................... | F25J 1/004 |
| 2018/0022432 A1* | 1/2018 | Lee | ........................ | B63H 21/14 123/495 |

FOREIGN PATENT DOCUMENTS

| | | |
|---|---|---|
| DE | 102004050419 A1 | 4/2006 |
| DE | 102012024717 A1 | 6/2014 |
| DE | 102013018334 A1 | 4/2015 |
| EP | 2363629 A1 | 9/2011 |
| EP | 3026323 A1 | 6/2016 |
| FR | 2766165 A1 | 1/1999 |
| FR | 2900399 A1 | 11/2007 |

\* cited by examiner

MODULE AND SYSTEM FOR DEPRESSURISING A CRYOGENIC TANK

CROSS REFERENCE TO RELATED APPLICATIONS

This application is a national phase filing under 35 C.F.R. § 371 of and claims priority to PCT Patent Application No. PCT/FR2017/051930, filed on Jul. 13, 2017, which claims the priority benefit under 35 U.S.C. § 119 of French Application No. 1656975, filed on Jul. 21, 2016, the contents of which are hereby incorporated in their entireties by reference

BACKGROUND

Some embodiments relate to a module for the depressurisation, collection and storage of a portion of gas layer coming from one or more cryogenic tanks. Some other embodiments are directed to a system using such a module.

Gas energy source means, within the meaning of some embodiments, any gas obtained from gas energy sources such as hydrogen, natural gas, biomethane, etc.

Currently, industrialised countries are doing their best to establish infrastructures functioning from gas energy sources because of the increase in the demand for energy.

Moreover, these efforts for establishing infrastructures functioning from such sources are also aimed at reducing the dependency of industrialised countries on oil.

Thus, the consumption of gas energy sources is currently tending to increase. This increase is, in particular, due to the fact that the combustion of these gas energy sources is much less polluting than the equivalent in coal or heavy fuel oil. They are therefore ideal choices for a more environmentally friendly energy production.

In particular, gas energy sources, in liquefied form (for example liquefied natural gas or LNG), are in particular being used more and more as a fuel for vehicles. Therefore, in order to satisfy demand, gas chains are becoming more dense and are developing quickly, increasing exchanges of gas between producers, transporters, distributors and suppliers. However, since gas energy sources are products that change over time, evaporations thereof in the atmosphere are also increasing because of these exchanges. It happens that the question of the management of these evaporations of LNG has remained in the background until the present time. The massive development of these gas chains will make the situation more and more tricky from an environmental and safety point of view. This is because these discharges of gas into the atmosphere must be minimised from an environmental and safety point of view.

With regard more particularly to the use of gas energy sources in liquefied form as a fuel for vehicles, it happens that such vehicles, in service, park in car parks (for example rest areas at the side of roads and motorways) or are returned to their captive fleet depot. During these phases of parking or storage, the vehicles are stopped in an environment situated at ambient temperature (typically between 10° C. and 25° C. in western countries, which causes a rise in pressure of the gas phase in the tank, which is caused by the evaporation of the gas energy source in liquefied form (for example LNG) caused by ingresses of heat.

In order to preserve the integrity of the tank, it is usually equipped with a safety valve that opens, releasing the pressurised gas to atmosphere.

These various situations obviously involve several major drawbacks:
the discharge of a greenhouse gas into the atmosphere,
the risk of the presence of an explosive atmosphere around the stored vehicles, a risk that is currently not dealt with unless very difficult and expensive procedures unsuited to a massive development of the network are established.

Moreover, when a vehicle running on liquefied natural gas (LNG) is in an LNG station in a situation of filling one or more tanks, it is possible to prevent degassing and to recover the gas volume expelled out of the tank by depressurising the tank under optimum conditions. However, if the vehicle is not in a filling situation, the only solution currently existing to prevent degassing consists of purging, or expelling these gases into the atmosphere, through the safety valve, in order to keep the internal gases of the tank at a pressure below the maximum operating pressure for the purpose of not impairing the integrity of the tank.

Thus, in the various existing solutions, to prevent any discharge of gas phases of fuel into the atmosphere:
either it is necessary to be in a station and in addition in a filling situation in order to prevent degassing,
or the valve opens in order to degas directly into the atmosphere for the purpose of preserving the integrity of the tank, with the consequences mentioned above.

SUMMARY

To solve the aforementioned faults and drawbacks, the applicant has developed a module for depressurisation and storage of a portion of gas layer coming from a cryogenic tank, which makes it possible both to collect the excess gas and to reprocess it according to future uses.

More particularly, the subject matter of some embodiments is therefore a module for the depressurisation, collection and storage of a portion of a gas layer coming from at least one vehicle cryogenic tank, the cryogenic tank including at least one valve, the gas layer being the gaseous phase of a gas energy source, the cryogenic tank containing, apart from the gas layer, a liquid layer that is the liquid phase of a gas energy source,
the module being characterised in that it constitutes a sealed assembly including:
an inlet E intended to be connected, by a removable inlet pipe, to at least one orifice of the tank for the discharge, out of the cryogenic tank (100), of a portion of gas layer, the orifice being fitted or not with a valve,
an outlet S intended to be connected, by a removable outlet pipe, to an external system suitable for using the portion of gas layer once discharged,
a heater connected to the inlet E of the module,
a damping buffer tank, connected to the heater, and also to
a compressor, connected to the buffer tank, and also to
a storage means connected to the outlet of the module, the storage means making it possible to store the portion of gas layer discharged.

The module according to some embodiments allows the depressurisation, collection and storage of a portion of gas layer coming from at least one vehicle cryogenic tank, it being understood that a vehicle may contain a plurality of cryogenic tanks (in general two for land vehicles of the lorry type).

Vehicle means, within the meaning of some embodiments, a land, sea or air vehicle including at least one cryogenic tank.

Cryogenic tank means, within the meaning of some embodiments, any tank that can easily be used by an operator not having any advanced training for manipulation thereof and its content, the tank also being suitable for storing liquid and/or gas at a temperature of less than or equal to −60° C. and at an absolute pressure greater than or equal to 1 bar.

Depressurisation module means, within the meaning of some embodiments, a module for depressurising at least one cryogenic tank.

Module means, within the meaning of some embodiments, a module that is functionally self-supporting and transportable, for example on a transportable platform of the utility vehicle type, wherein all the elements that make it up can be contained in a volume of no more than 16 m$^3$, that is to say a volume defined by a width of no more than two metres, a length of no more than four metres and a height of no more than two metres.

Module constituting a sealed assembly means, within the meaning of some embodiments, a module for which there is no emission of gas.

Damping buffer tank means, within the meaning of some embodiments, a tank making it possible to regulate the flow of gas in the module according to some embodiments, the damping buffer tank operating at a pressure equivalent to that of the gaseous phase of the cryogenic tank.

Advantageously, the module according to some embodiments may also include a heater (for example a heating tape) situated upstream of the buffer tank, in order to avoid damaging the various components of the module when the portion of discharged gas layer arrives in the module: the heating makes it possible to prevent it reaching a cryogenic temperature in the buffer tank.

The compressor, which is connected to the buffer tank and to the storage means, starts up in a predefined range of pressures, between a minimum value and a maximum value of set pressures in the buffer tank. Such an operating mechanism is well known in the prior art. The maximum set pressure is set on the downstream operating device, such as a gas transport and/or distribution network, or a mixed heat and electricity cogeneration system, or an electricity production system, or a system for distributing vehicle natural gas VNG.

Advantageously, the storage means has the capacity to store at high pressure (for example at 300 bar) the portion of gas layer discharged out of the cryogenic tank.

Advantageously, the module may further include an odouriser suitable for odourising the gaseous phase, this odouriser being situated between the damping buffer tank and the compressor, for the purpose of use downstream. Moreover, the odouriser also makes it possible to detect any leakage of gas in the environment and to prevent any danger for users of this module.

Advantageously, the module according to some embodiments may further include an additional outlet connected to the outlet of the compressor.

Another subject matter of some other embodiments is a system for the depressurisation, collection and storage of a portion of gas layer coming from at least one vehicle cryogenic tank including at least one valve, the gas layer being the gaseous phase of a gas energy source, the cryogenic tank containing, apart from the gas layer, a liquid layer that is the liquid phase of a gas energy source, the system being characterised in that it includes:
    the module according to some embodiments;
    a main removable inlet pipe for transporting the portion of gas layer coming from the cryogenic tank, between at least one orifice of the tank and the inlet of the module, the orifice being provided or not with a valve,
    at least one connection device for connecting the discharge orifice of the tank with the removable inlet pipe, the connection device being sealed and cryogenic, and
    a removable outlet pipe for transporting the portion of gas layer stored in the storage means, between the outlet (S) of the module and an external system able to store and/or use the portion of gas layer stored.

Preferably or advantageously, the removable outlet pipe is suitable for being connected to a downstream operating device, for example a gas transport and/or distribution network, a mixed heat and electricity cogeneration system, an electricity production system or a system for distributing vehicle natural gas (usually designated by the acronym VNG).

Advantageously, the inlet pipe and/or the outlet pipe may be flexible hoses.

The reader will also understand from reading the above that, advantageously, the main removable inlet pipe may include a manifold provided with a plurality of connection devices, so as to be able to be connected to a plurality of cryogenic tanks.

According to a particularly advantageous embodiment of the system according to some embodiments, the main removable inlet pipe may be a pipe allowing the controlled depressurisation of one or more cryogenic tanks: for this purpose, this pipe may include a means for maintaining or reducing the internal pressure of the cryogenic tank at a value equal to or less than a predetermined value. For example, when a vehicle provided with a cryogenic tank arrives at an installation containing the module according to some embodiments, an operator connects the orifice of the tank to the module via the removable pipe, for the purpose of if necessary reducing the pressure in the cryogenic tank, to a given value required for functioning for a given period without opening the valve of the cryogenic tank.

In this case, it is possible to use the system according to some embodiments in active mode, that is to say in order to maintain or reduce (controlled depressurisation) the internal pressure of the cryogenic tank at a value below a predetermined value.

According to a another particularly advantageous embodiment of some embodiments, the main removable inlet pipe may be connected to one or more cryogenic tanks via the discharge orifice. The removable pipe will then have to be provided with a flap valve, this having to be calibrated in order to be triggered at a given pressure corresponding to the pressure of the cryogenic reservoir, and below the pressure of opening of the valve of the cryogenic reservoir.

In this case, it is possible to use the system according to some embodiments in passive mode, that is to say while merely recovering the portion of gaseous phase escaping from the valve with which the discharge orifice is provided.

BRIEF DESCRIPTION OF THE FIGURES

Other advantages and particularities of some embodiments will emerge from the following description given by way of non-limitative example and made with reference to the accompanying figures.

The identical elements shown in FIGS. 1 to 6 are identified by identical numerical references.

DETAILED DESCRIPTION OF EXEMPLARY EMBODIMENTS

Figure 1:
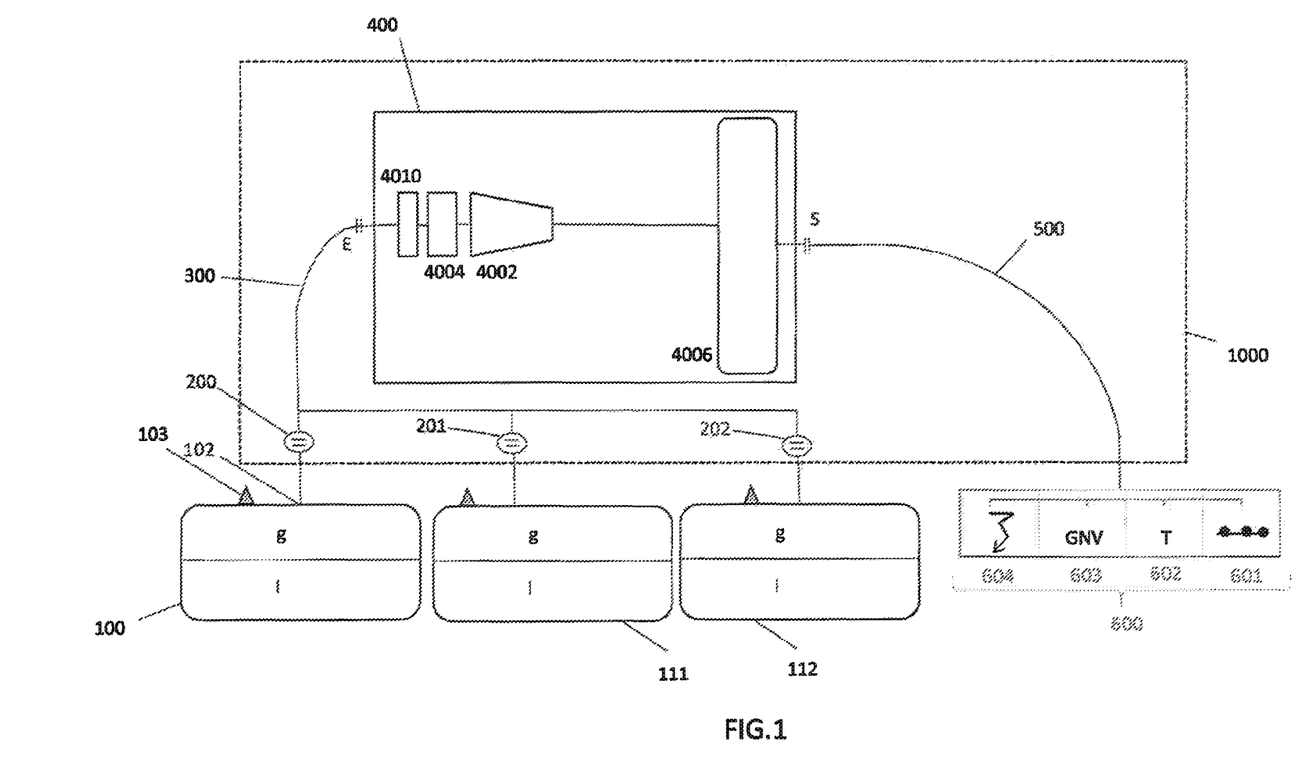
FIGS. 1 to 3 each show a general outline diagram of an example embodiment of the system according to some embodiments that can be used in active mode.
Figure 2:
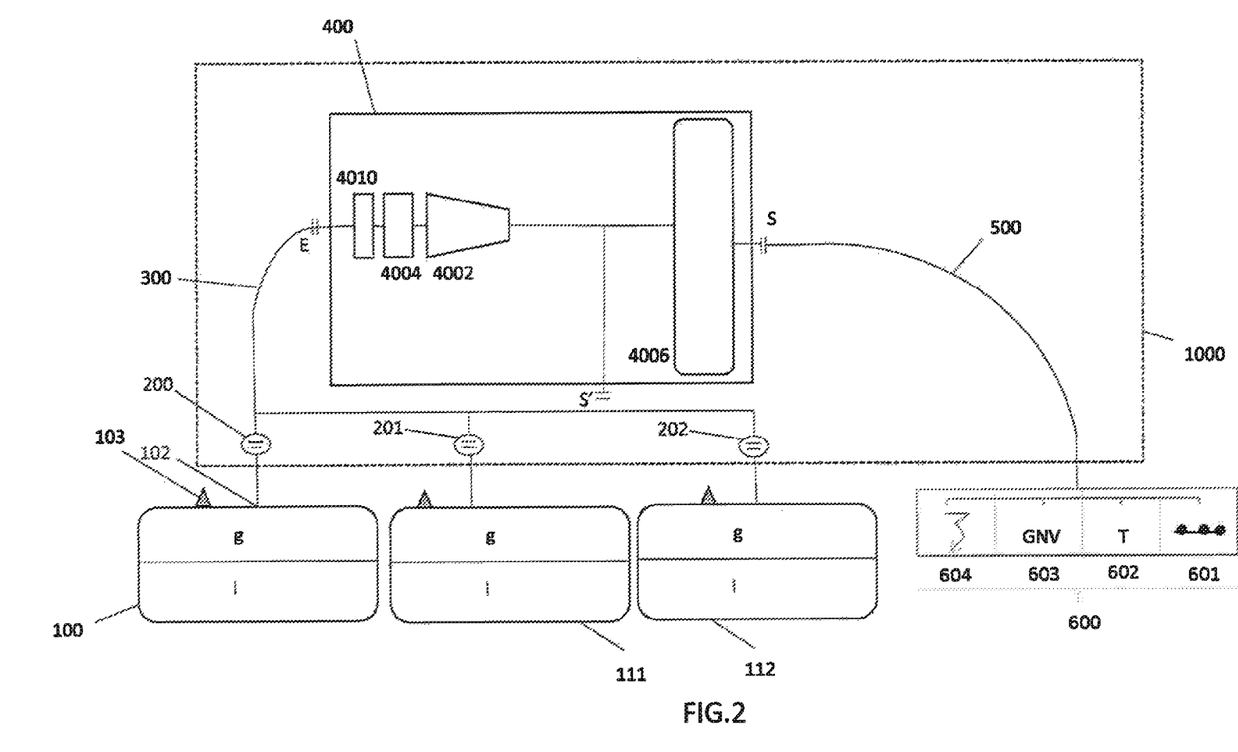
Figure 3:
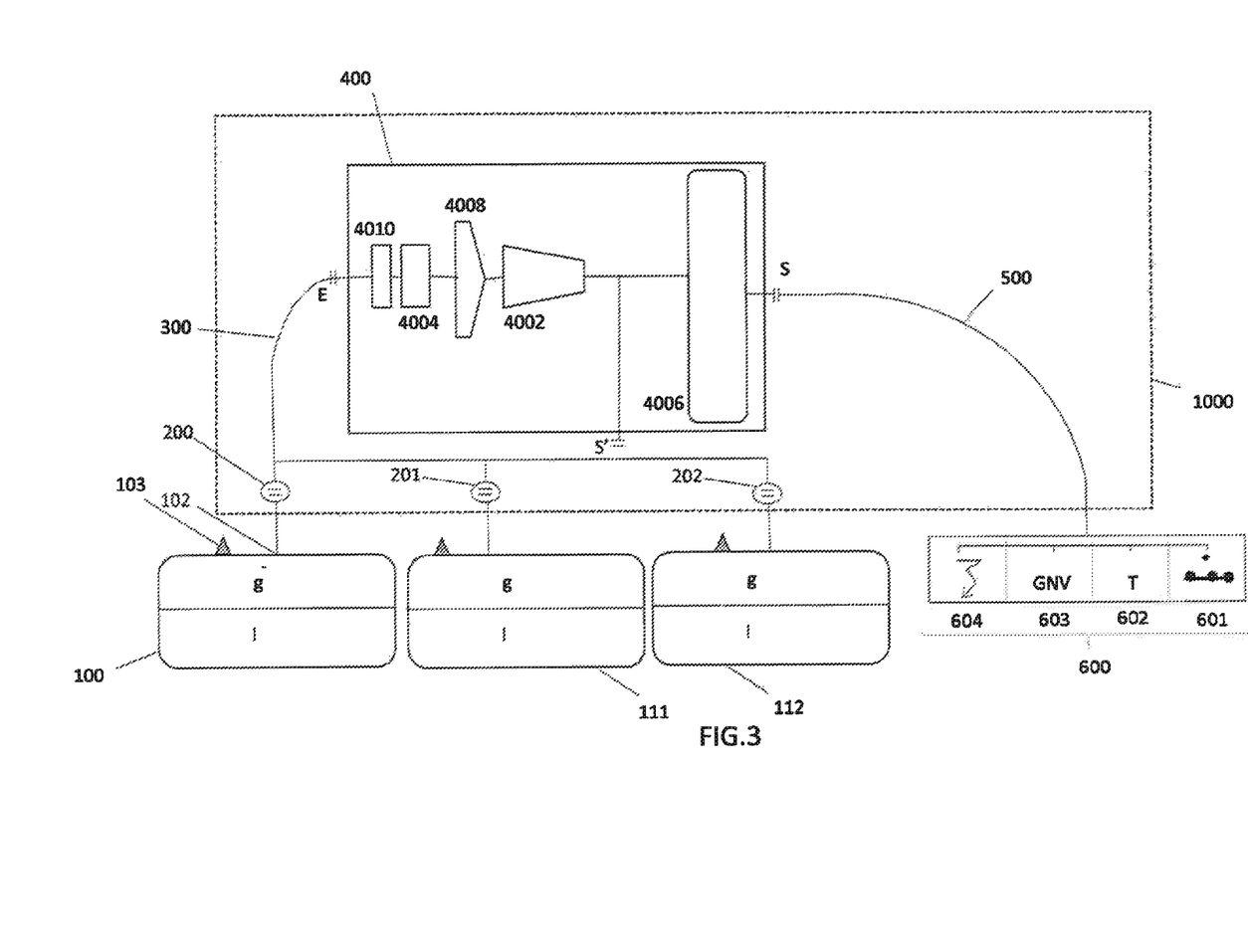

FIGS. 1 to 3 each show a general outline diagram of an example embodiment of the system according to some embodiments that can only be used in active mode.

More particularly, FIG. 1 shows a system for the depressurisation, collection and storage according to some embodiments including a depressurisation and storage module 400 according to some embodiments.

The depressurisation and storage module 400 illustrated in FIG. 1 includes:
an inlet E intended to be connected, by a removable inlet pipe 300, to an orifice 102 (not provided with a flap valve in these embodiments) of a plurality of cryogenic tanks 100, 111, 112, for the discharge, out of these tanks, of a portion of gas layer,
an outlet S intended to be connected, by a removable outlet pipe 500, to an external system able to use the portion of gas layer once discharged;
a heater 4010 connected to the inlet E of the module 400,
a damping buffer tank 4004, connected to the heater 4010, and also to a compressor 4002, connected to the buffer tank 4004, and also to
a storage means 4006 connected to the outlet S for storing the portion of gas layer discharged.

The depressurisation, collection and storage system according to some embodiments further includes:
a main removable inlet pipe 300 for transporting the portion of gas layer coming from three cryogenic tanks 100, 111, 112, the pipe 300 being connected to
a manifold provided with a plurality of connection devices 200, 201, 202 (for example three in number),
each of the connection devices 200, 201, 202 being connected to each of the discharge orifices 102 of the cryogenic tanks 100, 111, 112, these connection devices being sealed and cryogenic,
a removable outlet pipe 500 for transporting the portion of gas layer stored in the storage means 4008, between the outlet S of the module 400 and an external system 600 able to store and/or use the portion of gas layer stored.

FIG. 2 is differentiated from FIG. 1 through the presence of an additional outlet S' at the outlet of the compressor 4002 in the module 400 according to some embodiments.

FIG. 3 is differentiated from FIG. 2 through the presence of an odouriser 4008 between the buffer tank 4004 and the compressor 4002 in the module 400 according to some embodiments.

Figure 4:
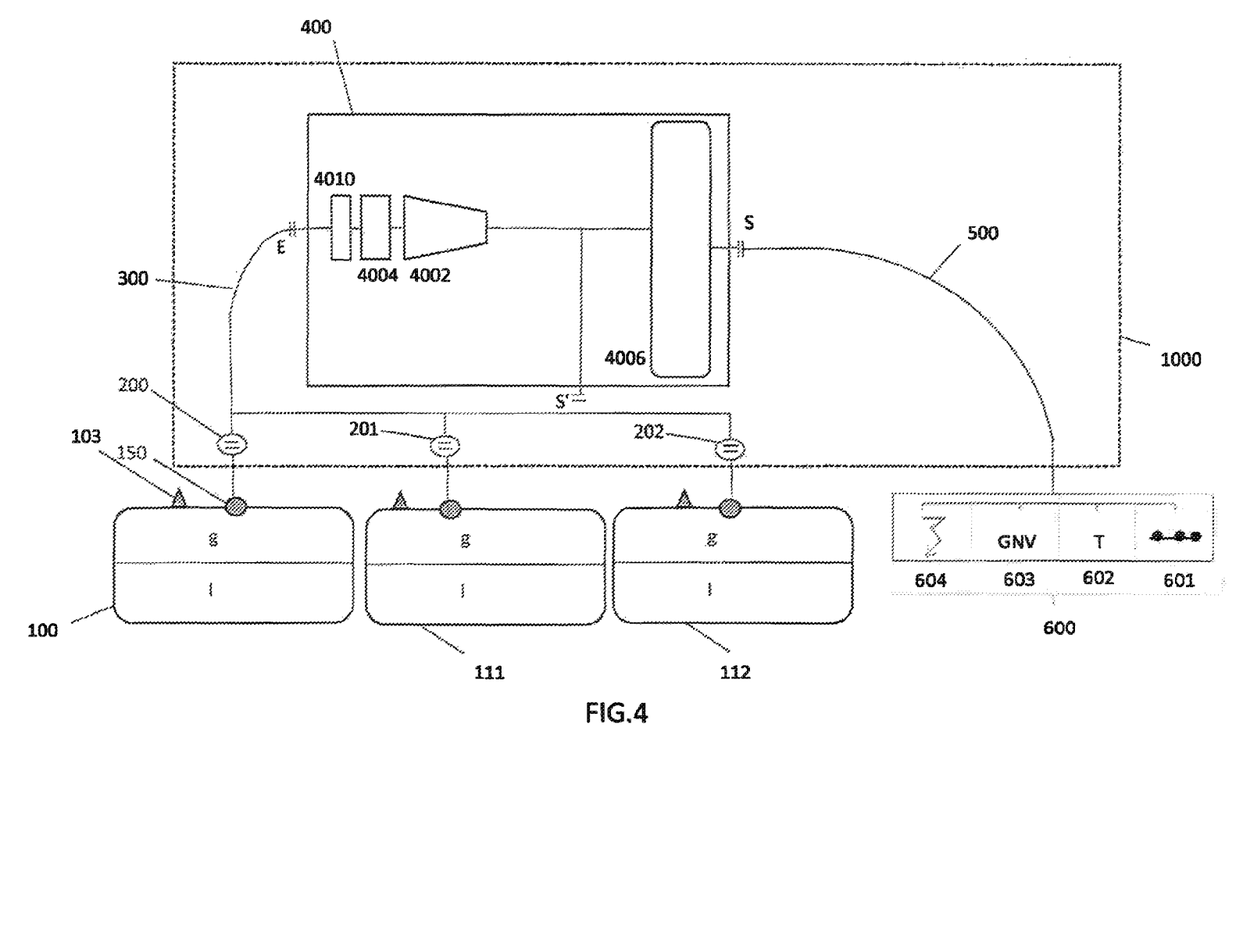
FIGS. 4 to 6 each show a general outline diagram of an example embodiment of the system according to some embodiments that can be used in passive mode.
Figure 5:
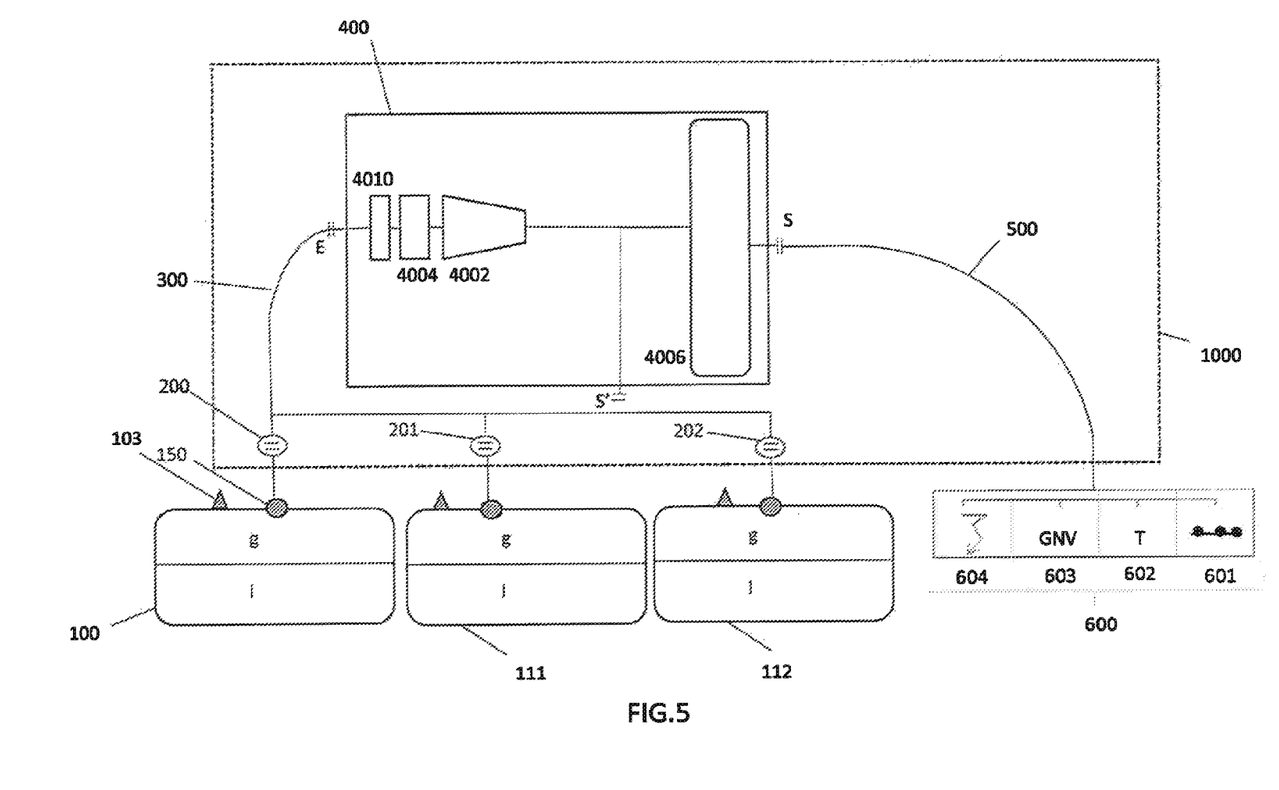
Figure 6:
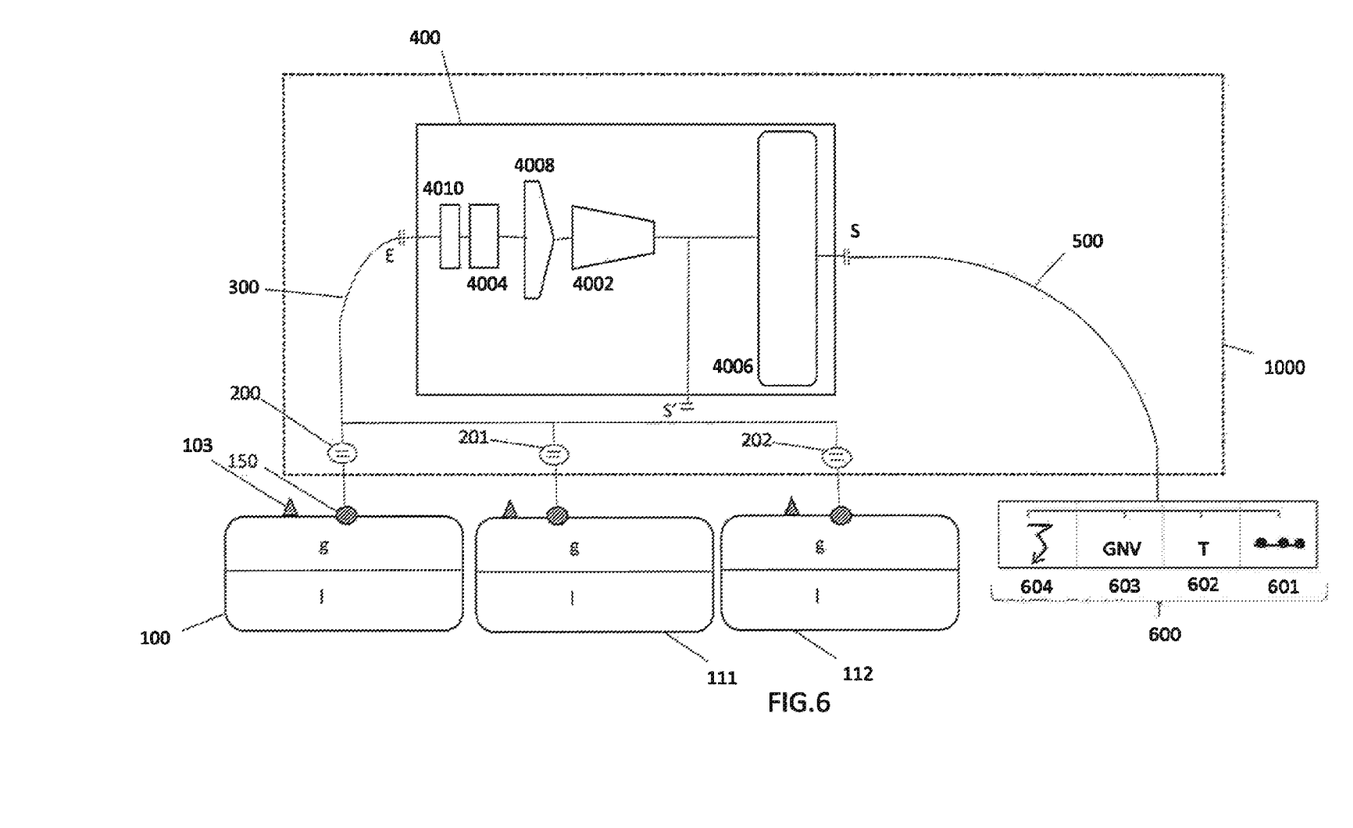

FIGS. 4 to 6 each show a general outline diagram of an example embodiment of the system according to some embodiments that can be used in active mode, but also in passive mode: this is made possible by the fact that, for each of these embodiments, the discharge orifice (102) of each cryogenic tank 100, 111, 112 is systematically provided with a flap valve (150), so as to recover the portion of gaseous phase escaping from the valve placed at the orifice (102).

Thus FIG. 4 shows an installation according to some embodiments differentiated from the one illustrated in FIG. 1 only through the presence of a flap valve 150 at the discharge orifice 102 of the cryogenic tanks 100, 111, 112.

Likewise, FIG. 5 shows an installation according to some embodiments (with additional outlet S') differentiated from the one illustrated in FIG. 2 only through the presence of a flap valve 150 at the discharge orifice 102 of the cryogenic tanks 100, 111, 112.

Finally, FIG. 6 shows an installation according to some embodiments (with odouriser 4008) differentiated from the one illustrated in FIG. 3 only through the presence of a flap valve 150 at the discharge orifice 102 of the cryogenic tanks 100, 111, 112.

The invention claimed is:

1. A system for depressurisation, collection and storage of a portion of a gas layer coming from at least one vehicle cryogenic tank including at least one valve, the gas layer being the gaseous phase of a gas energy source, and the cryogenic tank containing, apart from the gas layer, a liquid layer that is the liquid phase of the gas energy source,
the system comprises:
a compact module constituting a sealed assembly including:
an inlet configured to be connected, by a removable inlet pipe, to at least one discharge orifice of the tank for a discharge, out of the cryogenic tank, of a portion of the gas layer,
an outlet configured to be connected, by a removable outlet pipe, to an external system for using the portion of the gas layer once discharged,
a heater connected to the inlet of the module,
a damping buffer tank, connected to the heater, and also to a compressor,
the compressor, connected to the buffer tank, and also to a storage tank, and
the storage tank connected to the compressor and to the outlet of the module, the storage tank provided to store the portion of the gas layer discharged; and
wherein the module is functionally self-supporting and transportable on a transportable platform of the utility vehicle type,
wherein the sealed assembly is configured to contain all the elements in a volume defined by a width of no more than two meters, a length of no more than four meters and a height of no more than two meters,
the damping buffer tank operating at a pressure equivalent to that of the gaseous phase of the cryogenic tank;
a main removable inlet pipe for transporting the portion of the gas layer coming from the cryogenic tank, between the at least one discharge orifice of the tank and the inlet of the module,
at least one connecting device for connecting the at least one discharge orifice of the tank with the removable inlet pipe, and
a removable outlet pipe for transporting the portion of the gas layer stored in the storage, between the outlet of the module and the external system configured to store and/or use the portion of the gas layer stored,
wherein either (a) the main removable inlet pipe is a pipe for the controlled depressurisation of one or more cryogenic tanks, the pipe including a maintaining device or maintainer for maintaining or reducing the internal pressure of the cryogenic tank at a value equal to or less than a predetermined value or (b) the main removable inlet pipe is connected to one or more cryogenic tanks, the at least one discharge orifice being provided with a flap valve.

2. The system according to claim 1, wherein the removable outlet pipe is configured to connect to one selected from the group consisting of (a) a gas transport and/or distribution network, (b) a mixed heat and electricity cogeneration system, (c) an electricity production system, and (d) a system for distributing vehicle natural gas (VNG).

3. The system according to claim 1, wherein the inlet pipe and/or the outlet pipe are flexible hoses.

4. The system according to claim 1, wherein the main removable inlet pipe includes a manifold provided with a plurality of connection devices, configured to connect to a plurality of cryogenic tanks.

5. A method for maintaining or reducing the internal pressure of the cryogenic tank in an active mode of the system according to claim 1, when the main removable inlet pipe is a pipe for the controlled depressurisation of one or more cryogenic tanks, for at a value below a predetermined value.

6. A method for maintaining or reducing the internal pressure of the cryogenic tank in a passive mode of the system according to claim 1, when the at least one discharge orifice is provided with the flap valve, for recovering the portion of gaseous phase escaping from the flap valve.

7. The system according to claim 1, wherein the storage is able to store the portion of the gas layer discharged from the compressor at a pressure equal to or greater than 200 bar.

8. The system according to claim 1, further including an odouriser situated between the buffer tank and the compressor.

9. The system according to claim 1, further including an additional outlet connected to an outlet of the compressor.

* * * * *